United States Patent
Kim et al.

(10) Patent No.: US 7,881,168 B2
(45) Date of Patent: Feb. 1, 2011

(54) OPTICAL PICK-UP APPARATUS FOR MULTI RECORDING/REPRODUCING

(75) Inventors: Bong-gi Kim, Suwon-si (KR); Tae-youn Heor, Suwon-si (KR); Seong-su Park, Suwon-si (KR); Chun-seong Park, Suwon-si (KR); Soo-han Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1295 days.

(21) Appl. No.: 10/577,441

(22) PCT Filed: Apr. 9, 2004

(86) PCT No.: PCT/KR2004/000827
§ 371 (c)(1),
(2), (4) Date: Apr. 27, 2006

(87) PCT Pub. No.: WO2005/048251
PCT Pub. Date: May 26, 2005

(65) Prior Publication Data
US 2007/0070825 A1  Mar. 29, 2007

(30) Foreign Application Priority Data
Nov. 17, 2003 (KR) .................. 10-2003-0080924

(51) Int. Cl.
*G11B 7/00* (2006.01)
(52) U.S. Cl. .................. 369/44.37; 369/112.02; 369/112.24
(58) Field of Classification Search ............. 369/44.37
See application file for complete search history.

(56) References Cited

U.S. PATENT DOCUMENTS

| 5,917,798 A | 6/1999 | Horimai et al. |
| 5,933,401 A | 8/1999 | Lee et al. |

(Continued)

FOREIGN PATENT DOCUMENTS

JP  2002-10070  4/2002

OTHER PUBLICATIONS

PCT International Search Report issued Aug. 30, 2004 re: International Application No. PCT/KR2004/000827.

*Primary Examiner*—Van N Chow
(74) *Attorney, Agent, or Firm*—Stanzione & Kim, LLP

(57) ABSTRACT

An optical pickup apparatus is provided for use in a recording/reproducing apparatus to record/reproduce information on/from recording media having different formats. Such an optical pickup apparatus comprises a dual wavelength laser diode; a hologram module arranged to split a light which is incident to a recording medium into a plurality of beams; and a photo-detector arranged to receive a light beam reflected from the recording medium and detect an information signal and a signal for servo control. Each of the split beams is focused on a predetermined position corresponding to a format of the recording medium. The light beams reflected from the recording medium are detected by the photo-detector to generate a focus error signal and a tracking error signal. Thus, the optical pickup apparatus records and reproduces information on and from recording media having different formats by using a hologram of a simple pattern. The optical structure of the optical pickup apparatus is simple which enables easy assembly and manufacture and provides signal regeneration when operating in a high temperature.

21 Claims, 4 Drawing Sheets

U.S. PATENT DOCUMENTS

| | | |
|---|---|---|
| 6,043,911 A | 3/2000 | Yang |
| 6,369,377 B1 | 4/2002 | Shih et al. |
| 7,215,609 B2 * | 5/2007 | Shimano et al. .......... 369/44.37 |
| 2002/0021649 A1 | 2/2002 | Yoo et al. |
| 2003/0026179 A1 * | 2/2003 | Nagahara et al. ......... 369/44.37 |
| 2004/0105374 A1 * | 6/2004 | Ogasawara et al. .... 369/112.02 |
| 2004/0114495 A1 * | 6/2004 | Kim et al. .............. 369/112.24 |

* cited by examiner

OPTICAL PICK-UP APPARATUS FOR MULTI RECORDING/REPRODUCING

CROSS-REFERENCE TO RELATED APPLICATIONS

This application claims the benefit of PCT International Patent Application No. PCT/KR2004/000827, filed Apr. 9, 2004, and Korean Patent Application No. 2003-80924, filed Nov. 17, 2003, in the Korean Intellectual Property Office, the disclosures of which are incorporated by reference herein.

BACKGROUND OF THE INVENTION

1. Field of the Invention

The present invention relates an optical pickup apparatus. More particularly, the present invention relates to an optical pickup apparatus which is capable of recording/reproducing information on/from recording media having different formats by employing a dual wavelength laser diode and a hologram element.

2. Related Art

An optical pickup apparatus is commonly employed in an optical recording/reproducing apparatus, such as a compact disk (CD) player, a digital versatile disk (DVD) player, a CD-ROM driver, and a DVD-ROM to record/reproduce data on/from a recording medium, such as an optical disk, in a non-contact manner. In a recording mode, an optical pickup projects laser beams onto a surface of an optical disk to thereby form a pit. In a reproducing mode, the optical pickup optically reads out pit information from the optical disk and outputs read information in an electric signal form. In order to achieve the above performance, the optical pickup comprises a plurality of optical members, such as a laser diode for emitting laser beams, a diffraction grating, a beam splitter for adjusting deflection of the laser beam, a plurality of lenses for forming a light path, and a sensor for detecting a signal.

If the optical pickup apparatus is employed in the DVD player that is capable of high-density recording/reproduction, it has to be compatible with a compact disk (CD) or a CD-Recordable (CD-R).

However, the DVDs have a standard thickness that is different from that of the CDs. This is because of an allowable error of a mechanical disk slope and numerical aperture of an object lens. The thickness of CD is 1.2 mm, whereas the thickness of DVD is 0.6 mm. Regarding a wavelength of a light source for the reproduction, the CD is standardized to 780 nm, whereas the DVD is standardized to 650 nm. Due to the above differences, a general CD player is not able to reproduce data recorded on a DVD. Therefore, there is a demand for an optical pickup apparatus for DVD that is compatible with a general CD.

FIG. 1 illustrates a conventional optical pickup apparatus which has been developed in order to solve the above problem. Referring to FIG. 1, the conventional optical pickup apparatus comprises a light module 10 having a first light source 11 and a monitor photo-detector 13 which are integrally formed therewith; a second light source 20; a photo-detector 21 arranged to adjust an amount of light rays emitted from the second light source 20 in a data recording mode; a ½-wavelength plate 25 arranged to convert a p-polarized light emitted from the second light source 20 into a s-polarized light ray, a complex prism 30 acting as a polarized light beam splitter to convert light paths of light rays respectively emitted from the first and the second light sources 1, 20; a collimating lens 40 arranged to convert the light rays emitted from the first and the second light sources 11, 20 into parallel light rays; a reflection mirror 45 arranged to reflect incident light rays; a polarized light hologram element 50 arranged to split a light which is incident to a disk 100 to a plurality of beams; an object lens 60 for focusing the split beams on the disk 100, and a third photo-detector 80 for receiving light beams which are reflected from the disk 100 and transmitted through the complex prism 30. One of the first and the second light sources is operated. The first light source 11 is configured for recording/reproducing data on/from a CD, and emits light rays of 780 nm wavelength. In contrast to the first light source 11, the second light source 20 is configured for recording/reproducing data on/from a DVD, and emits light rays of 650 nm wavelength.

The polarized light hologram element 50 is designed to operate in response to the wavelength of light rays emitted from the second light source 20, i.e., in a DVD mode. In addition, the polarized light hologram element 50 operates only in response to the p-polarized light. The polarized light hologram element 50 has a ¼-wavelength plate formed on a surface thereof opposing to the disk 100 so that the polarized light hologram element 50 can convert an incident s-polarized light into a circularly polarized light and convert a reflection light from the disk 100 to the p-polarized light. Only the light containing a p-polarized light, which is emitted from the second light source 20 and reflected from the disk 100, is split into 10 beams by the polarized light hologram element 50.

In addition, a third photo-detector 80 is further arranged to receive the 10 split beams to thereby obtain data information and error information from the disk 100. The third photo-detector 80 comprises a plurality of sensors for detecting light rays reflected from the DVD and a single sensor for detecting light rays reflected from the CD.

Since the conventional optical pickup apparatus as described in connection with FIG. 1, aligns optical axes of the lights having different wavelengths by use of the complex prism 30 and achieves a simple optical structure by use of the collimating lens 40, an improved signal regeneration can be obtained when operating at a high temperature (recording and reproducing). However, it is difficult to fabricate the complex prism 30, as a variety of technologies are required in assembling the complex prism 30 with such an optical pickup apparatus. In addition, an assembly tolerance between the object lens 60 and the polarized light hologram element 50 cannot be solved, and, similarly, the pickup adjustment cannot be achieved due to the splitting of light into 10 beams. Moreover, since two laser diodes are used, an optical axis error occurs between the two lights emitted from the two laser diodes. Due to the complicate structure and a great number of assembly parts required, the assembly process deteriorates, which causes an inferiority of a product.

Since a power of a laser in a DVD recording mode is stronger that that in a reproducing mode, the optical pickup apparatus is operated at a relatively high temperature. Since inner parts of a pickup head are assembled using an UV (Ultraviolet) bond, connection portions may warp and expand at the high temperature. In this case, the light transmitted through the parts or reflected from the parts deviates from the photo-detector, which deteriorates the signal regeneration at the high temperature. In order to solve the above problems, there is a demand for new ways to remove unnecessary parts and/or minimize the number of beams deviating from the photo-detector.

Furthermore, the conventional optical pickup has problems of a lowered productivity which is caused by difficulty in assembling, a reduction of yield, and an increased manufacturing cost which is caused by the great number of optical elements.

Accordingly, there is a need for an optical pickup apparatus for use in an optical recording/reproducing apparatus to record/reproduce data on/from recording media having different formats that is simple in terms of construction and assembly, and that is effective in terms of manufacturing cost, adjustment and signal regeneration while operating at a high temperature.

SUMMARY OF THE INVENTION

Various aspects and example embodiments of the present invention advantageously provide a compatible optical pickup apparatus having an improved construction and a simple optical structure which uses a dual wavelength laser diode and a polarized light hologram element for splitting a light which is incident to a disk, into multiple beams, thereby providing a tracking error to record data on recording media of different formats, while obtaining an improvement in signal regeneration.

In accordance with an aspect of the present invention, an optical pickup apparatus is provided with a light source module having a first light source for DVD and a second light source for CD to emit light rays of a different wavelength, which operates one of the first and the second light sources in conformance with the standard of a recording medium, for emitting a light containing a p-polarized light. A light splitting element is arranged to transmit a part of the light rays emitted from the light source to a monitor photo-detector which monitors a magnitude of the emitted light rays to control of the operation of the light source, and reflect the remaining light rays in a predetermined direction so that the light rays are incident to the recording medium. A collimating lens is arranged to convert the light rays which are reflected from the light splitting element into parallel light rays and make the parallel light rays incident to a hologram module. The hologram module is arranged to split the incident light into 5 beams, and the respective beams are focused by an object lens to respectively form optical spots on predetermined positions of a recording surface of the recording medium. A photo-detector is arranged to receive the beams which are reflected from the recording medium and pass through the object lens, the hologram module, the collimating lens and the light splitting member, thereby providing an information signal and an error signal. A sensor lens is arranged on a front surface of the photo-detector for adjusting the light rays reflected from the recording medium to be incident on the photo-detector with a predetermined size.

The light source module utilizes a dual wavelength laser diode (LD) for generating light rays having different wavelengths, i.e., light rays for recording/reproducing data on/from a DVD-family optical disk, such as DVD-R, DVD-RW, DVD+RW, DVD-RAM, and DVD-ROM, and light rays for recording/reproducing data on/from a CD-family optical disk, such as CD-R, CD-RW, and CD-ROM.

The hologram module comprises a polarized light hologram formed in a circular pattern for splitting only predetermined polarized light rays, and a ¼-wavelength plate arranged on a surface of the polarized light hologram opposite to the object lens for turning a phase of the polarized light rays by 90°.

Preferably, the polarized light hologram is divided into a first hologram and a second hologram which are operated in response to the light rays emitted from the first light source. The first and the second holograms are formed on the same plane in a semicircular shape and located one on the other. The first and the second holograms diffract the light by a predetermined angle with respect to an optical axis of the light to thereby generate zero-order and ±1 order beams.

Preferably, the zero-order beam generated by the first and the second holograms is focused by the object lens on a predetermined position conforming to the standard of a DVD-ROM.

Preferably, the −1 order beam generated by the first hologram and the +1 order beam generated by the second hologram are focused by the object lens on predetermined positions conforming to the standard of a DVD-R/DVD-RW.

Preferably, the +1 order beam generated by the first hologram and the −1 order beam generated by the second hologram are focused by the object lens on predetermined positions conforming to the standard of a DVD-RAM.

The photo-detector comprises 5 DVD sensors which correspond to the respective five split beams and are arranged apart from one another by a predetermined distance.

If a DVD-ROM is used as a recording medium, a focus error signal and a tracking error signal generated at the photo-detector by an astigmatism method and by a DPD (Differential Phase Detection) method, respectively, are calculated with respect to a signal of the zero-order beam which is reflected from the DVD-ROM and received at an associated DVD sensor.

If a DVD-RAM is used as a recording medium, a focus error signal generated at the photo-detector by a DAD method and a tracking error signal generated at the photo-detector by one of DPP and PP (Push Pull) methods are calculated with respect to a signal of the zero-order beam reflected from the DVD-RAM, a signal of the +1 order beam generated by the first hologram, and a signal of the −1 order beam generated by the second hologram, which are received at associated DVD sensors.

If a DVD-R/DVD-RW is used as a recording medium, a focus error signal and a tracking error signal generated at the photo-detector by an astigmatism method and a DPP method are calculated with respect to a signal of the zero-order beam reflected from the DVD-R/DVD-RW, a signal of the −1 order beam generated by the first hologram, and a signal of the +1 order beam generated by the second hologram, which are received at associated DVD sensors.

If a CD is used as a recording medium, a focus error signal and tracking error signal generated by the photo-detector by an astigmatism method and a PP method are calculated with respect to a signal of light emitted the second light source which is reflected from the CD and received at the CD sensor.

As described above, the optical pickup apparatus according to the present invention is capable of recording/reproducing data on optical media having different formats by use of a simple pattern hologram, and also compensating for the tilting of optical axes of DVD and CD by use of a dual wavelength laser diode. As a result, the assembling and adjustment can be easily achieved by the simple optical structure, a manufacturing cost can be reduced, and a signal regeneration can be improved when the optical pickup apparatus operates at a high temperature.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
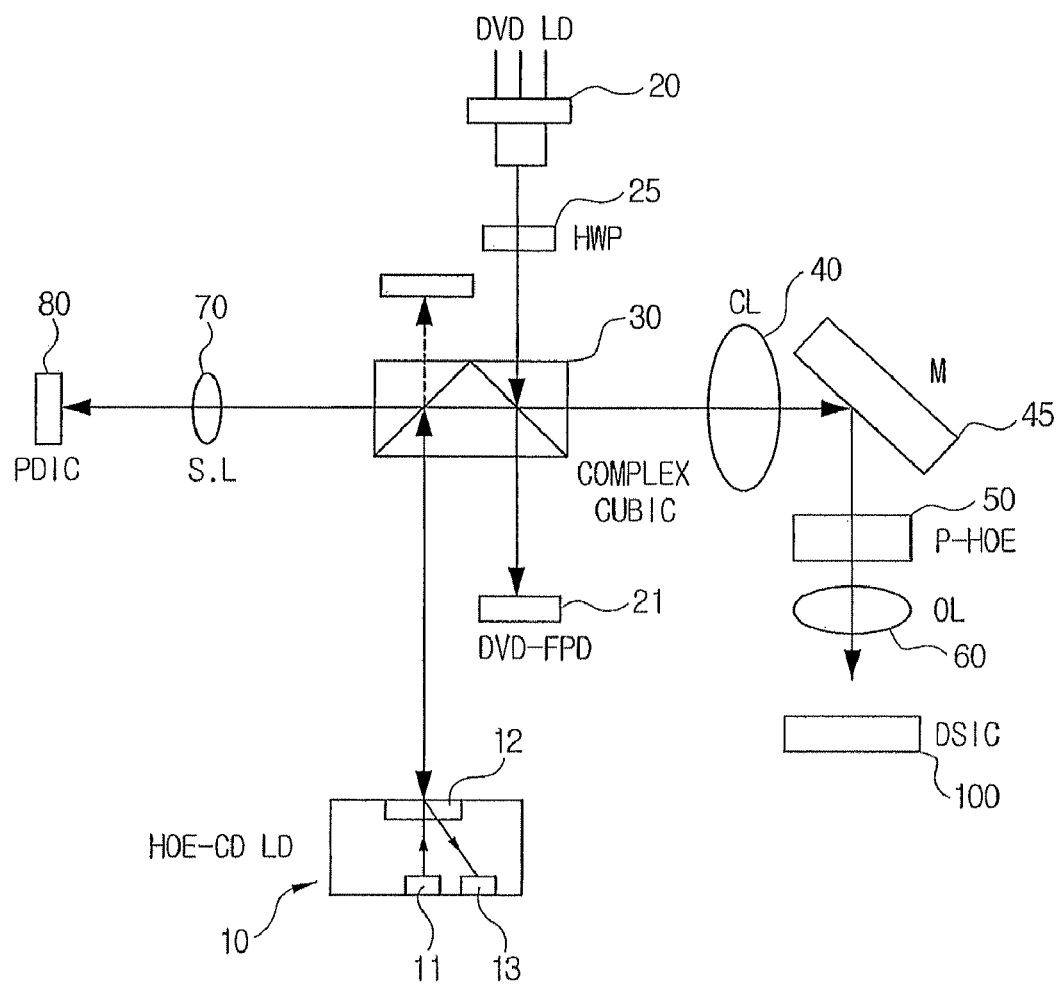
FIG. 1 is a schematic view of a compatible optical pickup apparatus.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
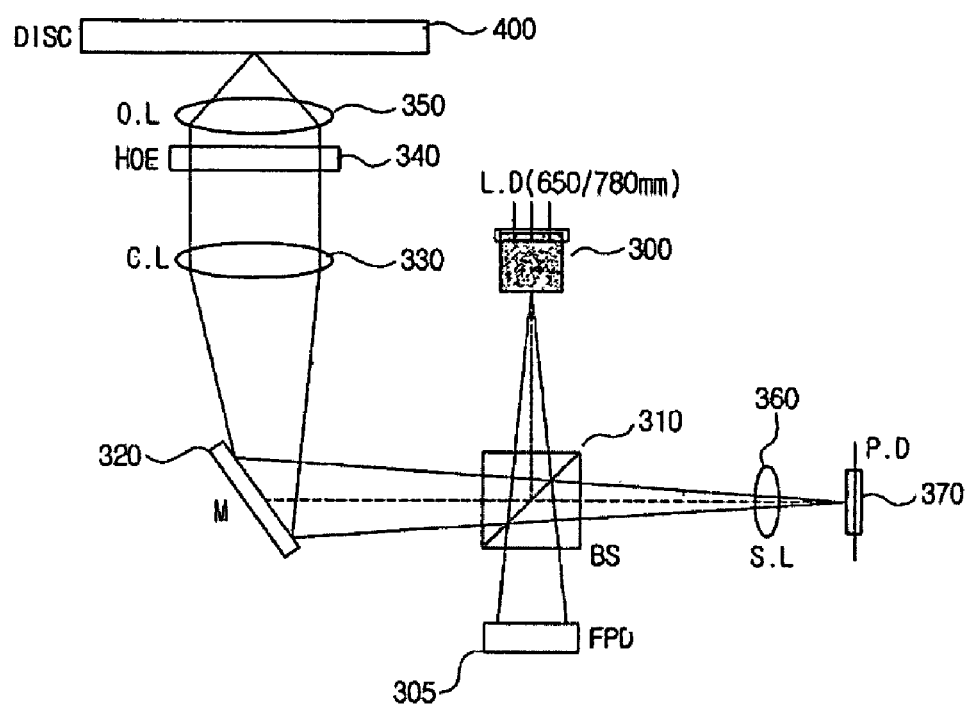
FIG. 2 is a schematic view of a compatible optical pickup apparatus according to an embodiment of the present invention.

FIG. 2 is a schematic view of an optical pickup apparatus according to an embodiment of the present invention.

Referring to FIG. 2, an optical pickup apparatus according to an embodiment of the present invention comprises a light source module 300, a monitor photo-detector 305, a light beam splitter 310, a reflection mirror 320, a collimating lens 330, a hologram module 340, an object lens 350, a sensor lens 360, and a photo-detector 370.

The optical pickup apparatus according to the present invention is employed in an optical recording/reproducing apparatus (not shown), such as a CD Player (Compact Disk Player), a DVD Player (Digital Video Disk Player), and a DVD Recorder (Digital Video Disk Recorder), to record data on an optical disk 400, optically read out data from the optical disk 400, convert the read data into an electrical signal, and output the electrical signal. The optical disk 400 is an optical recording medium on which data is recorded, and includes a family of DVD, including, for example, DVD-R, DVD-RW, DVD+RW, DVD-RAM, DVD-ROM and a family of CD, including, for example, CD-R, CD-RW, CD-ROM. However, the various DVDs and CDs listed should not be considered as limiting; rather, other type of optical media, such as blu-ray discs (BD) and the next generation of optical media may be included.

The light source module 300 employs a dual wavelength laser diode (LD) and comprises a first light source for a DVD (Digital Video Disc) and a second light source for a CD (Compact Disc) which are integrated in a single case (e.g. can) and emits light rays having different wavelengths. The first light source uses visible rays of approximately 650 nm wavelength and the second light source uses infrared rays of approximately 780 nm wavelength. The light ray emitted from each light source contains a p-polarized light. In this embodiment, an incident light refers to a light that is emitted from each light source and then is incident to the optical disk 400, and a reflection light refers to a light that is reflected from the optical disk 400 and then is received at the light detector 370.

The first light source is operated when a DVD is mounted in the optical recording/reproducing apparatus (not shown), whereas the second light source is operated when a CD is mounted in the optical recording/reproducing apparatus. The first and the second light sources are arranged and spaced-apart by a predetermined distance within the light source module 300 are used to record a predetermined signal on the optical disk 400, or to read out a signal from the optical disk 400. Also, the first and the second light sources are configured so that major axes of laser beams are perpendicular to each other with respect to a pitch. Accordingly, in a recording mode, pitches are formed along a track direction more accurately.

Hereinafter, description will now be made about a case that data is recorded/reproduced on/from the DVD when the first light source is operated. The monitor photo-detector 305 receives light rays emitted from the first light source and transmitted through the light beam splitter 310, and detects an amount of the light rays. The light emitted from the first light source for recording data on the DVD has a magnitude of approximately 10 mW and the light for reproducing the data has a magnitude of approximately 1 mW. The monitor photo-detector 305 monitors the emitted light rays and controls the magnitude thereof.

The light beam splitter 310 acts as a polarized light beam splitter and uses a cubic to transmit a part of incident polarized beams and reflect remaining polarized beams in a predetermined direction. The cubic is designed to transmit a small amount of p-polarized light rays and send the same to the monitor photo-detector 305, make most of the light rays incident to the optical disk 400, and transmit all of the s-polarized light rays.

The reflection mirror 320 adjusts a light path so that the light reflected from the light beam splitter 310 is incident to the optical disk 400.

The collimating lens 330 has a predetermined radial angle, and converts the light beam emitted from the LD into a parallel beam, and is employed for the purpose of compensating for deterioration of a recording efficiency which is caused by aberration of the light beams transmitted through a plurality of optical members.

Figure 3:
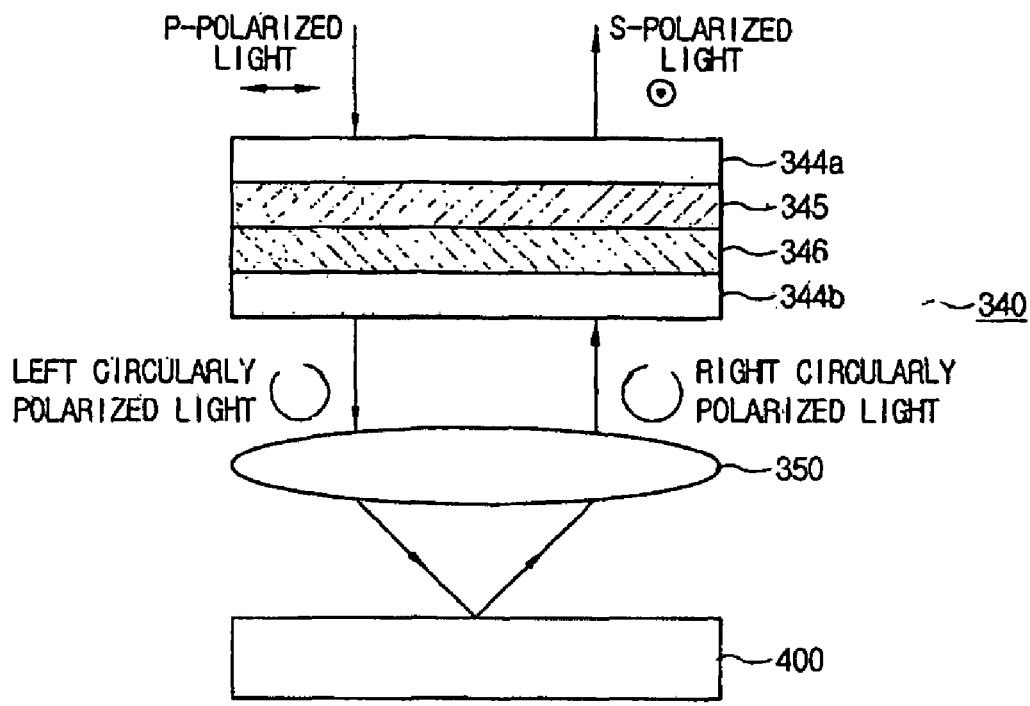
FIG. 3 is a view showing a hologram module according to an embodiment of the present invention.

FIG. 3 is a view showing a hologram module according to an embodiment of the present invention. Referring to FIG. 3, the hologram module 340 splits a light into a plurality of beams according to a state of polarization of the light, and comprises a pair of glasses 344a and 344b, a polarized light hologram 345 and a ¼-wavelength plate 346.

The polarized light hologram 345 is operated in response to only the p-polarized light. If the polarized light hologram 345 is operated in response to the s-polarized light, transmission efficiency deteriorates. The operation of the polarized light hologram 345 will now be described as below.

The ¼-wavelength plate 346 phase-changes a linearly polarized light by 90° and converts it into a circularly polarized light. That is, the ¼-wavelength plate 346 converts the p-polarized light transmitted through the polarized light hologram 345 into a left circularly polarized light and converts a reflection light of a right circularly polarized light reflected from the optical disk 400 into a s-polarized light. Accordingly, the polarized light hologram 345 is not operated when the reflection light containing the s-polarized light passes through the polarized light hologram 345.

Figure 4:
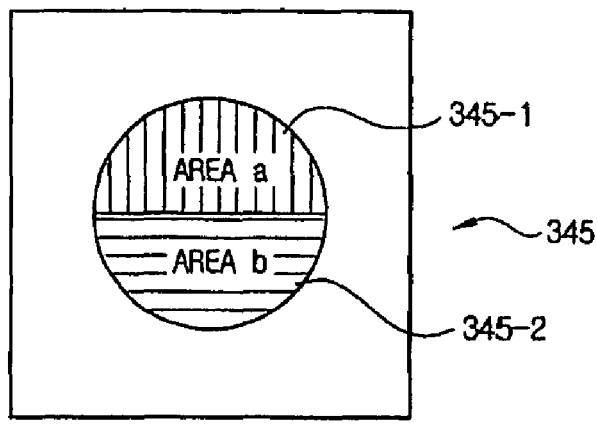
FIG. 4 is a view showing configuration of a polarized light hologram shown in FIG. 3.

FIG. 4 is a view showing the polarized light hologram 345 shown in FIG. 3. Referring to FIG. 4, the polarized light hologram 345 has a circular hologram corresponding to a cross-section of the incident light and is divided into a first hologram section 345-1 (i.e., Area "a") and a second hologram section 345-2 (i.e., Area "b"), both of which have a semicircular shape and are located one on the other to form a circular shape. The first and the second hologram sections 345-1 and 345-2 perform different operations.

Incident light passing through the first hologram section 345-1 is divided into a zero-order beam that goes straight through the first hologram section 345-1 and ±1 order beams that advance with a predetermined diffraction angle by the operation of the first hologram section 345-1. Incident light passing through the second hologram section 345-2 is divided into a zero-order beam that goes straight through the second hologram section 345-2 and ±1 order beams that advance with a predetermined diffraction angle different from that of the first hologram section 345-1 by the operation of the second hologram section 345-2. Since the two semicircular zero-order beams combine into a single circular zero-order beam, the incident light passing through the polarized light hologram 345 is split into 5 beams.

In the present situation, the −1 and +1 order beams of the first hologram section 345-1 are respectively referred to as second and fifth beams, the zero-order beam as a third beam, and the −1 and +1 order beams of the second hologram section 345-2 as first and fourth beams, respectively. The respective diffraction angles are determined depending on a characteristic of the object lens 350 and a kind of the optical disk 400 so that the respective split beams are focused on a predetermined position of the optical disk 400.

The object lens 350 focuses the 5 beams on a predetermined position of the optical disk 400 and performs a focusing servo and a tracking servo by use of an actuator (not shown).

Figure 5:
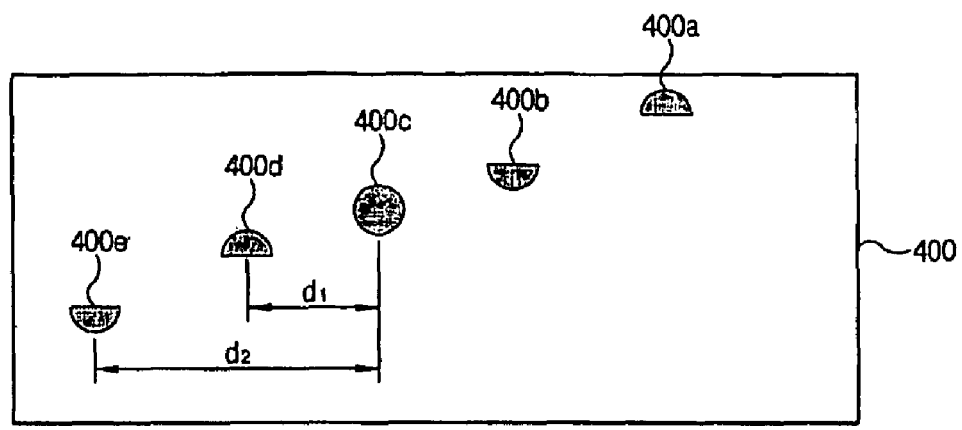
FIG. 5 is a view showing split beams focused on an optical disk according to an embodiment of the present invention.

FIG. 5 is a view showing five (5) beams focused on the optical disk 400. Referring to FIG. 5, of the 5 beams, the third beam is focused by the object lens 350 on a third position 400c that conforms to the standard of the DVD-ROM. The second and the fourth beams are focused on a second position 400b and a fourth position 400d. The second position 400b and the fourth position 400d are distanced from the third position 400c by a vertical distance d, that conforms to the standards of the DVD-R and the DVD-RW. The first and fifth beams are focused on first and fifth positions 400a and 400e which are distanced from the third position 400c by a predetermined vertical distance $d_2$ that conforms to the standard of the DVD-RAM.

The sensor lens 360, which is a concave lens, focuses the split beams reflected from the optical disk 400 on a corresponding position of the photo-detector 370 in cooperation with the collimating lens 330, and amends an optical length occurring due to a tolerance.

Figure 6:
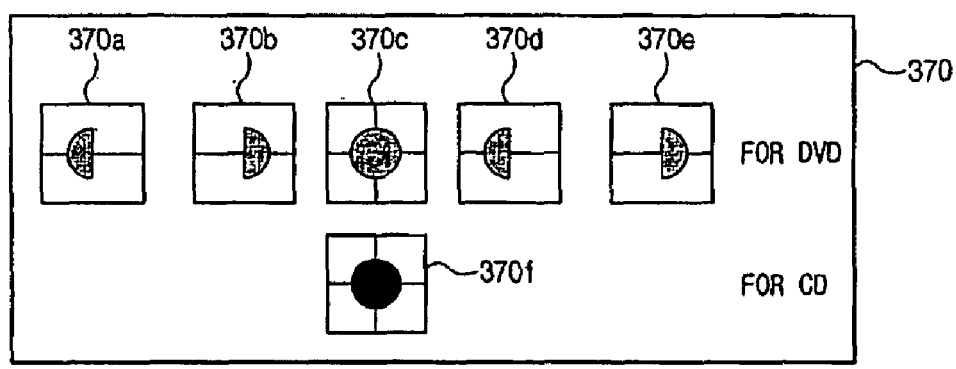
FIG. 6 is a view showing sensors of a photo-detector according to an embodiment of the present invention.

The photo-detector 370 is a photodiode integrated circuit (IC) that detects an information signal of the 5 split beams which were reflected from the optical disk 400 and passed through the object lens 350 and the light splitting element 310, a focusing error signal and a tracking error signal, and converts them into electric signals, The photo-detector 370 according to the present invention is a 6 split detector and comprises 5 DVD sensors 370a, 370b, 370c, 370d, and 370e arranged to sense optical characteristics of a DVD, and a single CD sensor 370f arranged to sense optical characteristics of a CD, as shown in FIG. 6. The DVD sensors and the CD sensor are arranged apart from one another by a predetermined distance d' from a center to a center. The predetermined distance d' is obtained by taking into consideration optical characteristics, such as a gap between the DVD light source and the CD light source and thickness/location/angle of the light beam splitter 310. For example, the predetermined distance d' is proportional to the thickness of the light beam splitter 310.

The first sensor 370a and the fifth sensor 370e of the DVD sensor detect signals corresponding to the first and the fifth beams, the second sensor 370b and the fourth sensor 370d detect signals corresponding to the second and the fourth beams, and the third sensor 370c detects a signal corresponding to the third beam. When the second light source is operated for the reproduction of the CD, the sixth sensor 370f detects a signal of beams emitted from the second light source.

The signals detected by the respective sensors of the photo-detector 370 are used to perform a servo control. The servo control is divided into a focus servo control for focusing the light rays on a reading system embedded in a DVD player and a tracking servo control for maintaining a constant position of the optical disk 400. The focus servo control is to control a focal point of light rays on a recording surface of the optical disk 400, while the tracking servo control is to control such that the pickup is always located at a constant position to prevent the focal point from being deviated from a pitch line.

The optical disk 400 has a different thickness and a different pitch gap depending on the kind of the optical disk 400. A servo control method in recording/reproducing data is also different depending on the kind of the optical disk 400. When a DVD-ROM disk is used as an optical disk 400, a focusing error (FE) signal by an astigmatism method and a tracking error (TE) signal by a DPD (Differential Phase Detection) method are generated from the optical disk 400. In particular, the FE signal and the TE signal are obtained from a signal of the third beam detected by the third sensor 370c.

If a DVD-RAM disk is used as an optical disk 400, a FE signal by the DAD method and a TE signal by the DPP or the PP (Push Pull) method are generated from the optical disk 400. In particular, the FE signal and the TE signal are obtained from signals of the first, third and fifth beams detected by the first, third and fifth sensors 370a, 370c, and 370e.

If a DVD-R and a DVD-RW disks are used as an optical disk 400, a FE signal is calculated by the astigmatism method and a TE signal is calculated by the DPP method. The FE signal is included in a signal of the third beam detected by the third sensor 370c and the TE signal is obtained from signals of the second, third and fourth beams detected by the second, third, and fourth sensors 370b, 370c and 370d.

If a CD is used as an optical disk 400, a FE signal is calculated by the astigmatism method and a TE signal is calculated by the PP (Push Pull) method. The FE signal and the TE signal are obtained from a signal of the beams detected by the sixth sensor 370f.

The actuator adjusts the object lens 350 in response to the FE and TE signals generated from the respective disks, and performs the servo control.

In the above-described embodiment, the optical pickup apparatus is capable of recording/reproducing with respect to the DVDs having different formats, and it is capable of reproducing only with respect to the CD. However, if a hologram module for CD is employed and a structure of the photo-detector and a tracking method thereof are changed, the CD is recordable. As a result, the optical pickup apparatus can be utilized in an optical recording/reproducing apparatus for recording/reproducing data on/from both a DVD-family optical disk, such as DVD-R, DVD-RW, DVD+RW, DVD-RAM, and DVD-ROM, and a CD-family optical disk, such as CD-R, CD-RW, and CD-ROM.

While the present invention has been particularly shown and described with reference to exemplary embodiments thereof, it will be understood by those of ordinary skill in the art that various changes in form and details may be made therein without departing from the spirit and scope of the present invention. For example, any high density optical disc, such as blue-ray disc (BD) and advanced optical disc (AOD) provided with a single recording layer or multiple recording layers may also be utilized. In addition, different structure of a photo-detector, as shown in FIG. 6, with different light beams, as shown in FIG. 5, can also be arranged. Likewise, multiple laser diodes can also be arranged at different locations to emit light rays having different wavelengths. Moreover, different elements, such as, a light source module 300, a light splitting element 310, a hologram module 340, a photo-detector 370, and a monitor photo-detector 305, as shown in FIG. 2, can be arranged different to still realize the simplicity and effectiveness of the disclosed invention. Accordingly, it is intended, therefore, that the present invention not be limited to the various example embodiments disclosed, but that the present invention includes all embodiments falling within the scope of the appended claims.

The invention claimed is:

1. An optical pickup apparatus comprising:
   a light source module having a first light source and a second light source which emit light rays of different wavelengths to record/reproduce data on/from recording media having different standards, the first light source emitting light rays corresponding to a first recording medium and the second light source emitting light rays corresponding to a second recording medium, the light source module operating a selected one of the first and the second light sources;
   an object lens arranged to focus light rays emitted from the selected light source to form an optical spot on a predetermined position of a recording surface of a recording medium;
   a light splitting element arranged to transmit a part of the light rays emitted from the selected light source and reflect the remaining light rays to oppose to the object lens, the light splitting element transmitting all of the light rays reflected from the recording medium;
   a collimating lens arranged on a light path formed between the light splitting element and the object lens to convert the light rays into parallel light rays;
   a hologram module arranged on a light path between the collimating lens and the object lens to split a light which is incident to the recording medium, into a plurality of beams; and
   a photo-detector having a sensor corresponding to the first/second recording medium to receive light rays that are reflected from the recording medium and passed through the hologram module and detecting an information signal and an error signal,
   wherein the hologram module comprises:
   a polarized light hologram formed in a circular pattern to split only predetermined polarized light rays; and
   a ¼-wavelength plate arranged on a surface of the polarized light hologram opposite to the object lens to tune a phase of the polarized light rays by 90°,
   wherein the polarized light hologram is divided into a first hologram and a second hologram which are operated in response to the light rays emitted from the first light source, the first and the second holograms being formed on the same plane in a semicircular shape and located one on the other, the first and the second holograms diffracting the light rays by a predetermined angle with respect to an optical axis of the light rays to thereby generate zero-order and ±1 order beams, and
   wherein the zero-order beam generated by the first and the second holograms is focused by the object lens on a predetermined position conforming to the standard of a DVD-ROM.

2. The optical pickup apparatus as claimed in claim 1, further comprising:
   a monitor photo-detector arranged to receive light rays that pass through the light splitting element and monitor the received light rays passing through the light splitting element to adjust a magnitude of the light emitted from the first and the second light sources; and
   a sensor lens arranged on a front surface of the photo-detector to adjust the light rays reflected from the recording medium to be incident on the photo-detector with a predetermined size.

3. The optical pickup apparatus as claimed in claim 1, wherein the −1 order beam generated by the first hologram and the +1 order beam generated by the second hologram are respectively focused by the object lens on predetermined positions conforming to the standard of a DVD-R/DVD-RW.

4. The optical pickup apparatus as claimed in claim 1, wherein the +1 order beam generated by the first hologram and the −1 order beam generated by the second hologram are respectively focused by the object lens on predetermined positions conforming to the standard of a DVD-RAM.

5. The optical pickup apparatus as claimed in claim 1, wherein the photo-detector comprises 5 DVD sensors which correspond to the plurality of split beams and are arranged apart from one another by a predetermined distance.

6. The optical pickup apparatus as claimed in claim 5, wherein, when a DVD-ROM is used as the first recording medium, a focus error signal and a tracking error signal generated at the photo-detector by an astigmatism method and by a DPD (Differential Phase Detection) method, respectively, are calculated with respect to a signal of the zero-order beam which is reflected from the DVD-ROM and received at an associated first recording medium sensor.

7. The optical pickup apparatus as claimed in claim 5, wherein, when a DVD-RAM is used as the first recording medium, a focus error signal generated at the photo-detector by a DAD method and a tracking error signal generated at the photo-detector by one of the-DPP and the-PP (Push Pull) methods are calculated with respect to a signal of the zero-order beam reflected from the DVD-RAM, a signal of the +1 order beam generated by the first hologram, and a signal of the −1 order beam generated by the second hologram, which are received at associated first recording medium sensors.

8. The optical pickup apparatus as claimed in claim 5, wherein, when a DVD-R/DVD-RW is used as the first recording medium, a focus error signal and a tracking error signal generated at the photo-detector by an astigmatism method and a DPP method are calculated with respect to a signal of the zero-order beam reflected from the DVD-R/DVD-RW, a signal of the −1 order beam generated by the first hologram, and a signal of the +1 order beam generated by the second hologram, which are received at associated first recording medium sensors.

9. The optical pickup apparatus as claimed in claim 5, wherein, when a CD is used as the second recording medium, a focus error signal and tracking error signal generated by the photo-detector by an astigmatism method and a PP method are calculated with respect to a signal of light emitted the second light source which is reflected from the CD and received at the second recording medium sensor.

10. An optical pickup device of a recording/reproducing apparatus, comprising:
- a first light source to emit light rays having a first wavelength;
- a second light source to emit light rays having a second wavelength;
- an object lens arranged to focus light rays emitted from a selected light source from one of the first and second light sources to form an optical spot on a predetermined position of a recording surface of a recording medium;
- a light splitting element arranged to transmit a part of the light rays emitted from the selected light source, while reflecting remaining light rays emitted from the selected light source to oppose to the object lens, and transmitting all of the light rays reflected from the recording medium;
- a collimating lens disposed between the light splitting element and the object lens to convert the light rays into parallel light rays;
- a hologram module disposed between the collimating lens and the object lens to split a light which is incident to the recording medium, into a plurality of beams; and
- a photo-detector having a plurality of sensors to receive light rays emitted from the selected light source that are reflected from the recording medium and passed through the hologram module, and to detect an information signal and an error signal,
- wherein the hologram module comprises:
- a polarized light hologram formed in a circular pattern to split only predetermined polarized light rays;
- and a ¼-wavelength plate arranged on a surface of the polarized light hologram opposite to the object lens to tune a phase of the polarized light rays by 90°,
- wherein the polarized light hologram is divided into a first hologram and a second hologram which are operated in response to the light rays emitted from the first light source, the first and the second holograms being formed on the same plane in a semicircular shape and located one on the other the first and the second holograms diffracting the light rays by a predetermined angle with respect to an optical axis of the light rays to thereby generate zero-order and ±1 order beams, and
- wherein the zero-order beam generated by the first and the second holograms is focused by the object lens on a predetermined position conforming to the standard of a DVD-ROM.

11. The optical pickup apparatus as claimed in claim 10, wherein the first and second light sources are packaged in a single module and originated from a dual wavelength laser diode which generates light rays having one of a wavelength of 650 nm to record/reproduce data on/from a DVD-family optical disk and a wavelength of 780 nm to record/reproduce data on/from a CD-family optical disk.

12. The optical pickup apparatus as claimed in claim 11, further comprising:
- a monitor photo-detector arranged to receive light rays that pass through the light splitting element and monitor the received light rays passing through the light splitting element to adjust a magnitude of the light rays emitted from the selected light source; and
- a sensor lens arranged on a front surface of the photo-detector to adjust the light rays reflected from the recording medium to be incident on the photo-detector with a predetermined size.

13. The optical pickup apparatus as claimed in claim 11, wherein the +1 order beam generated by the first hologram and the −1 order beam generated by the second hologram are respectively focused by the object lens on predetermined positions conforming to the standard of a DVD-RAM.

14. The optical pickup apparatus as claimed in claim 13, wherein, when a DVD-RAM is used as the recording medium, a focus error signal generated at the photo-detector by a DAD method and a tracking error signal generated at the photo-detector by one of DPP and PP (Push Pull) methods are calculated with respect to a signal of the zero-order beam reflected from the DVD-RAM, a signal of the +1 order beam generated by the first hologram, and a signal of the −1 order beam generated by the second hologram, which are received at associated DVD sensors.

15. The optical pickup apparatus as claimed in claim 11, wherein the −1 order beam generated by the first hologram and the +1 order beam generated by the second hologram are respectively focused by the object lens on predetermined positions conforming to the standard of a DVD-R/DVD-RW.

16. The optical pickup apparatus as claimed in claim 15, wherein, when a DVD-R/DVD-RW is used as the recording medium, a focus error signal and a tracking error signal generated at the photo-detector by an astigmatism method and a DPP method are calculated with respect to a signal of the zero-order beam reflected from the DVD-R/DVD-RW, a signal of the −1 order beam generated by the first hologram, and a signal of the +1 order beam generated by the second hologram, which are received at associated DVD sensors.

17. The optical pickup apparatus as claimed in claim 11, wherein the photo-detector comprises five DVD sensors which correspond to the plurality of split beams and are arranged apart from one another by a predetermined distance to receive light rays that are reflected from the DVD-family optical disk, and a single CD sensor to receive light rays that are reflected from the CD-family optical disk.

18. The optical pickup apparatus as claimed in claim 17, wherein, when a CD is used as the recording medium, a focus error signal and tracking error signal generated by the photo-detector by an astigmatism method and a PP method are calculated with respect to a signal of light emitted the second light source which is reflected from the CD and received at the CD sensor.

19. The optical pickup apparatus as claimed in claim 11, wherein, when a DVD-ROM is used as the recording medium, a focus error signal and a tracking error signal generated at the photo-detector by an astigmatism method and by a DPD (Differential Phase Detection) method, respectively, are calculated with respect to a signal of the zero-order beam which is reflected from the DVD-ROM and received at an associated DVD sensor.

20. An optical pickup device of a recording/reproducing apparatus, comprising:
- a dual wavelength laser diode arranged to emit light rays having a selected one of a first wavelength to record/reproduce data on/from a DVD-family optical disk and a second wavelength to record/reproduce data on/from a CD-family optical disk;
- an object lens arranged to focus light rays of a selected wavelength to form an optical spot on a predetermined position of a recording surface of an optical disk;
- a light splitting element arranged to transmit a part of the light rays emitted from the dual wavelength laser diode, while reflecting remaining light rays to oppose to the object lens, and transmitting all of the light rays reflected from the optical disk;
- a collimating lens disposed between the light splitting element and the object lens to convert the light rays into parallel light rays;

a hologram module disposed between the collimating lens and the object lens to split a light which is incident to the recording medium, into a plurality of beams; and a photo-detector arranged to receive light rays emitted from the dual wavelength laser diode that are reflected from the optical disk and passed through the hologram module, and to detect an information signal and an error signal, wherein the hologram module comprises:

a polarized light hologram formed in a circular pattern to split only predetermined polarized light rays;

and a ¼-wavelength plate arranged on a surface of the polarized light hologram opposite to the object lens to tune a phase of the polarized light rays by 90°, wherein the polarized light hologram is divided into a first hologram and a second hologram which are operated in response to the light rays emitted from the dual wavelength laser diode the first and the second holograms being formed on the same plane in a semicircular, shape and diffracting the light rays by a predetermined angle with respect to an optical axis of the light rays to thereby generate zero-order and ±1 order beams, and wherein the zero-order beam generated by the first and the second holograms is focused by the object lens on a predetermined position conforming to the standard of a DVD-ROM, the −1 order beam generated by the first hologram and the +1 order beam generated by the second hologram are respectively focused by the object lens on predetermined positions conforming to the standard of a DVD-R/DVD-RW, and the +1 order beam generated by the first hologram and the −1 order beam generated by the second hologram are respectively focused by the object lens on predetermined positions conforming to the standard of a DVD-RAM.

21. The optical pickup apparatus as claimed in claim 20, wherein the photo-detector comprises five (5) DVD sensors which correspond to the plurality of split beams and are arranged apart from one another by a predetermined distance to receive light rays that are reflected from the DVD-family optical disk, and a single CD sensor to receive light rays that are reflected from the CD-family optical disk.

* * * * *